United States Patent
Hoss et al.

(10) Patent No.: US 10,782,208 B2
(45) Date of Patent: *Sep. 22, 2020

(54) INJECTOR TESTING DEVICE (71) Applicant: Robert Bosch GmbH, Stuttgart (DE)

(72) Inventors: Reinhard Hoss, Plochingen (DE);
Armin Batha, Aichwald (DE); Daniel Strack, Uhingen (DE)

(73) Assignee: Robert Bosch GmbH, Stuttgart (DE)

( * ) Notice: Subject to any disclaimer, the term of this patent is extended or adjusted under 35 U.S.C. 154(b) by 156 days.

This patent is subject to a terminal disclaimer.

(21) Appl. No.: 15/761,163

(22) PCT Filed: Jul. 25, 2016

(86) PCT No.: PCT/EP2016/067668
§ 371 (c)(1),
(2) Date: Mar. 19, 2018

(87) PCT Pub. No.: WO2017/050462
PCT Pub. Date: Mar. 30, 2017

(65) Prior Publication Data
US 2018/0259423 A1 Sep. 13, 2018

(30) Foreign Application Priority Data
Sep. 21, 2015 (DE) .................. 10 2015 218 102

(51) Int. Cl.
*G01M 15/02* (2006.01)
*F02M 65/00* (2006.01)
(Continued)

(52) U.S. Cl.
CPC ........ *G01M 15/02* (2013.01); *F02M 63/0225* (2013.01); *F02M 65/00* (2013.01); *F02M 65/001* (2013.01); *F16M 1/00* (2013.01)

(58) Field of Classification Search
CPC ................ G01M 15/02; F02M 65/00
(Continued)

(56) References Cited

U.S. PATENT DOCUMENTS 4,037,468 A * 7/1977 Emerson .............. G01M 13/00
73/114.45
D352,806 S * 11/1994 Skovron .................. D18/50
(Continued)

FOREIGN PATENT DOCUMENTS

CN 1975148 A 6/2007
DE 102010038760 A1 2/2012
(Continued)

OTHER PUBLICATIONS

International Search Report dated Oct. 4, 2016, of the corresponding International Application PCT/EP2016/067668 filed Jul. 25, 2016.

*Primary Examiner* — Eric S. McCall
(74) *Attorney, Agent, or Firm* — Norton Rose Fulbright US LLP; Gerard Messina (57) ABSTRACT An injector testing device includes a fluid pump, which is configured to convey a test oil; a motor, which is connected mechanically to the fluid pump and is configured to drive the fluid pump; at least one injector holding device for mounting at least one injector to be tested; and a rail, which is configured to receive the test oil conveyed by the fluid pump and to fluidly connect to at least one injector to be tested. In this context, the rail is mounted in the injector testing device in such a manner, that it may be swiveled with respect to the at least one injector holding device, in order to align it with the injector to be tested.

5 Claims, 7 Drawing Sheets (51) Int. Cl.
*F02M 63/02* (2006.01)
*F16M 1/00* (2006.01)

(58) Field of Classification Search
USPC .............. 73/114.45, 114.77, 116.01, 116.02, 73/116.04
See application file for complete search history.

(56) References Cited

U.S. PATENT DOCUMENTS

| | | | | |
|---|---|---|---|---|
| 6,234,002 | B1* | 5/2001 | Sisney | F02M 65/001 |
| | | | | 134/166 R |
| 2005/0217359 | A1* | 10/2005 | Wildman | F02M 65/00 |
| | | | | 73/114.51 |
| 2007/0240500 | A1* | 10/2007 | Pollard | F02M 65/00 |
| | | | | 73/114.48 |
| 2009/0019935 | A1* | 1/2009 | Horak | F02M 65/00 |
| | | | | 73/593 |
| 2013/0031775 | A1* | 2/2013 | Cueto | F02M 55/004 |
| | | | | 29/700 |
| 2013/0206937 | A1* | 8/2013 | Kordass | F02M 65/00 |
| | | | | 248/176.3 |
| 2013/0220275 | A1* | 8/2013 | Stein | F02M 53/00 |
| | | | | 123/447 |
| 2013/0291631 | A1 | 11/2013 | Kordass et al. | |
| 2017/0058851 | A1* | 3/2017 | Colvin | F02M 55/02 |
| 2018/0266378 | A1* | 9/2018 | Hoss | F02M 65/00 |
| 2018/0372050 | A1* | 12/2018 | McCormack | F02M 65/006 |

FOREIGN PATENT DOCUMENTS

| | | |
|---|---|---|
| DE | 102011075485 A1 | 5/2012 |
| KR | 20120084890 A | 7/2012 |
| KR | 20160125057 A | 10/2016 |
| RU | 2406989 C2 | 12/2010 |
| WO | 2007049038 A1 | 5/2007 |

\* cited by examiner

INJECTOR TESTING DEVICE

FIELD

The present invention relates to an injector testing device.

BACKGROUND INFORMATION

To test injectors in an injector testing device, a test oil is brought up to the required pressure by a high-pressure pump (common rail pump) and supplied to a pressure reservoir or high-pressure rail. The test oil is distributed by the pressure reservoir or high-pressure rail to the injectors to be tested.

In this context, depending on the type of construction of the injector to be tested, different connecting lines, in particular, high-pressure hoses, must be used in order to connect the injector to the pressure reservoir or high-pressure rail.

The use of flexible connecting lines, in particular, connecting lines of different manufacturers, may influence the measuring results, which means that a functional relationship to a single or a few manufacturers may emerge. Even if high-pressure hoses of a single manufacturer are used, the measuring results may fluctuate due to manufacturing tolerances.

Therefore, it is desirable to improve the connection of the injectors to be tested to the high-pressure rail, in order to increase the stability of the measuring results.

According to one exemplary embodiment of the present invention, an injector testing device includes a fluid pump, which is configured to convey a test oil; a motor, which is connected mechanically to the fluid pump and is configured to drive the fluid pump; at least one injector holding device for mounting at least one injector to be tested; and a rail, which is configured to receive the test oil conveyed by the fluid pump and to fluidly connect to at least one injector to be tested. In this context, the rail is supported in such a manner, that it is able to swivel with respect to the injector holding device. In this manner, the position and the spatial orientation of the rail may be adjusted to the fluid connection (pressure tube connection) of the injector to be tested.

The rail is formed to have, in particular, at least one rigid connection piece for connecting at least one injector to be tested.

In this manner, the rail may be joined to the pressure tube connection of an injector to be tested, using a rigid connection piece. Therefore, the use of different high-pressure connections and flexible high-pressure hoses may be eliminated.

The operation is simplified, and only slight modifications are necessary, in order to be able to test different types of injectors, using a single injector testing device. Since rigid connection pieces are less subject to wear than flexible high-pressure hoses, the failure rate may be reduced, and the operational reliability may be increased. Since rigid connection pieces have lower manufacturing tolerances than flexible high-pressure hoses, the precision may be increased and, in particular, the reproducibility of the measuring results may be improved.

The connection pieces may be manufactured by machining, and may be obtained from different suppliers with uniform quality and finish. Thus, a functional relationship to one or a few suppliers may be prevented.

In one specific embodiment, the rail is pivoted about a horizontal axis, which means that the orientation of the rail may be adjusted particularly effectively to the geometry of injectors, which are preferably mounted perpendicularly for purposes of testing.

In one specific embodiment, the fluid pump and the motor are supported in such a manner, that they may swivel in unison with the rail. Thus, the fluid pump and the rail may be interconnected by a rigid fluid line. In this manner, the use of a flexible high-pressure hose may also be eliminated, here.

In one specific embodiment, the rail is joined to the fluid pump via a fluid connection, in particular, a fluid adaptor, in such a manner, that the rail may be rotated and/or swiveled with respect to the fluid pump. In this way, the mass to be pivoted is reduced, since the fluid pump and the motor are not swiveled together with the rail.

In one specific embodiment, the fluid pump, the motor and the rail are supported elastically, in particular, by an elastic pad/rubber pad, on a rack of the injector testing device, as a common assembly. Since the fluid pump and the rail are supported elastically as a common assembly, relative movements between the fluid pump and the rail do not occur during operation. Therefore, rigid fluid lines, in particular, steel lines, may be used in order to connect the fluid pump to the rail.

In one specific embodiment, the assembly includes a frame and/or a trough, in particular, an oil trough; the frame or the trough being supported elastically on a rack of the injector testing device. With the aid of a frame and/or a trough, the rail, the motor and the pump may be elastically supported together in a particularly effective manner.

In one specific embodiment, the at least one injector holding device is displaceable in at least one direction, in particular, in all three spatial directions. This allows an injector to be tested to be aligned optimally with the connection pieces of the rail, and as a result, a flexible fluid connection between the rail and the injector may be dispensed with.

In one specific embodiment, the at least one injector holding device includes a clamping device for clamping an injector to be tested. With the aid of a clamping device, an injector to be tested may be locked in position in the fixture in a rapid, secure and effective manner.

In one specific embodiment, the at least one injector holding device includes a spindle, a cone and a clamping ring, which are configured in such a manner, that the clamping ring is expandable by rotation of the spindle, in order to fix the injector holding device in position in a tube of the injector testing device without deformation.

DETAILED DESCRIPTION OF EXAMPLE EMBODIMENTS

Figure 1:
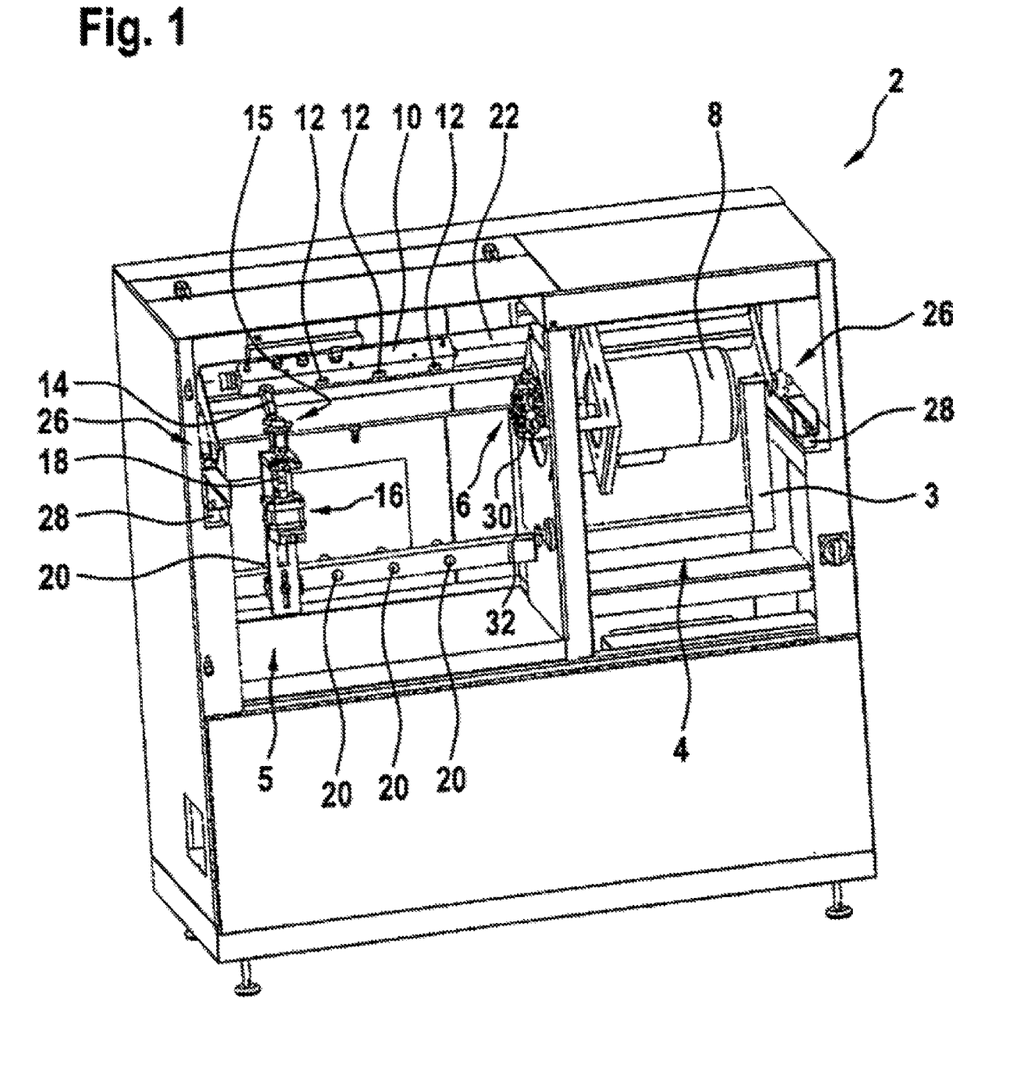
FIG. 1 shows a perspective front view of an injector testing device having an assembly according to one exemplary embodiment of the present invention.
Figure 2A:
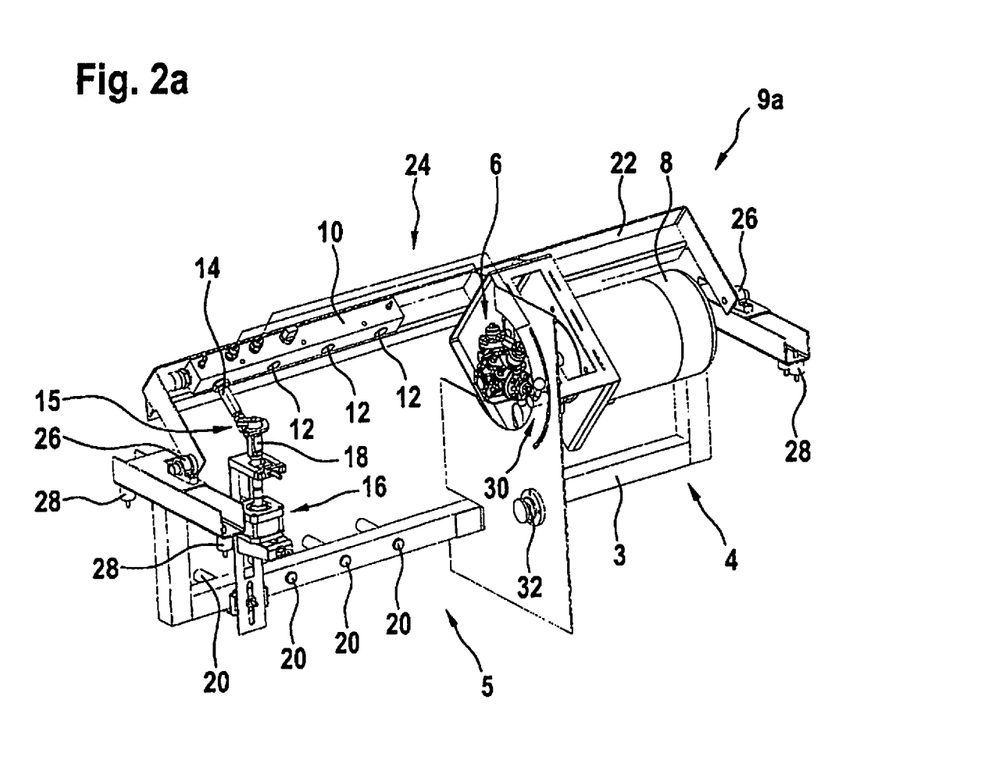
FIGS. 2a and 2b show, from two different angles, perspective views of the functional elements of the injector testing device shown in FIG. 1.
Figure 2B:
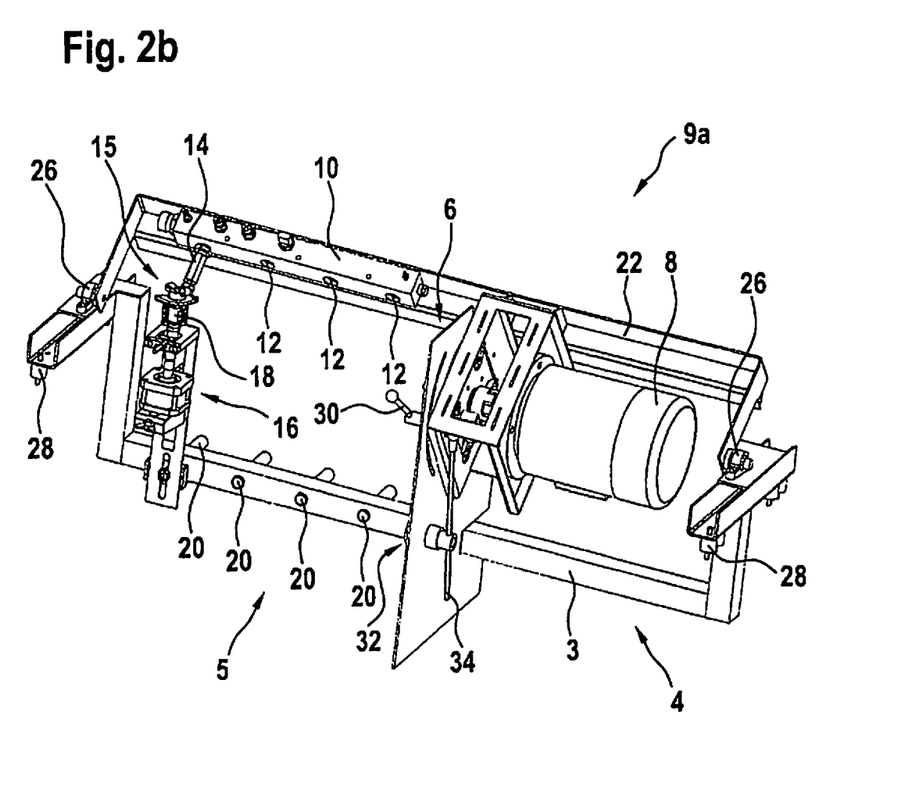

FIG. 1 shows a perspective front view of an injector testing device 2 having an assembly 9a according to one exemplary embodiment of the present invention. FIGS. 2a and 2b show perspective views, from two different angles, of assembly 9a, which includes the functional elements of injector testing device 2.

Injector testing device 2 includes a pressure generation region 4 depicted on the right and a testing region 5 depicted on the left in each of FIGS. 1, 2a and 2b.

Injector testing device 2 has a support frame 3, which supports a fluid pump (high-pressure pump) 6 and a motor 8 configured to drive fluid pump 6.

A swiveling frame 22 is supported on support frame 3 by two pillow block bearings 26 in such a manner, that it may swivel about a horizontal axis. This allows swiveling frame 22 to be adjusted about the horizontal axis to any desired angle from the horizontal to the vertical. Swiveling frame 22 may be locked into any desired position with the aid of a clamping lever 30. Alternatively, or in addition, the desired position may be secured by locking a toothed rack or threaded rod 34 into place in an actuating knob 32, the toothed rack or threaded rod being attached to swiveling frame 3.

Swiveling frame 22 supports a high-pressure reservoir, which is formed in the shape of a rail 10, is connected to the outlet side of fluid pump 6 by a plurality of fluid lines 24, and is configured to receive the fluid conveyed by fluid pump 6. Rail 10 includes a plurality of openings 12, which are each configured to receive a connection piece 14. Rail 10 is connected to an injector 18 to be tested (test specimen), via such a connection piece 14. In this context, injector 18 is retained by an injector holding device (injector clamping device) 16, which is supported at support frame 3 via a tube 20, which extends out from support frame 3. The details of injector holding device 16 are described further below, with reference to FIGS. 3a through 3c.

By pivoting the swiveling frame 22, the angle of the connection piece 14 attached to rail 10 is adjustable in such a manner, that connection piece 14 is oriented in a line with the pressure tube connection of injector 18. The position of injector 18 with respect to rail 10 may be set via adjustment of injector holding device 16 (see below), in such a manner, that connection piece 14 may be joined directly to the pressure tube connection of injector 18. Thus, a flexible fluid connection subject to wear, e.g., in the form of a hose, between rail 10 and injector 18, may be dispensed with.

Support frame 3 forms an assembly 9a together with swiveling frame 22, motor 8, high-pressure pump 6 and injector holding device 16. Assembly 9a is supported in a floating manner, on a rack 5 of injector testing device 2, by elastic pads 28, which are situated on the lower side of support frame 3. In this manner, vibrations, which are generated during operation of motor 8 and fluid pump 6, are not transmitted to rack 5 or only transmitted to it in a damped manner.

Since fluid pump 6 with its motor 8, rail 10 and each injector 18 mounted in an injector holding device 16 are supported together in a floating manner, no relative movements occur between these components, even during operation of fluid pump 6. Thus, fluid pump 6 and rail 10 may be interconnected by rigid fluid lines 24, which may be made of, in particular, steel. Therefore, the use of flexible high-pressure hoses subject to wear may be eliminated.

By using rigid fluid lines 24, which are made, in particular, of steel, the manufacturing and maintenance costs may be reduced, and the operational reliability of injector testing device 2 may be increased.

Figure 3A:
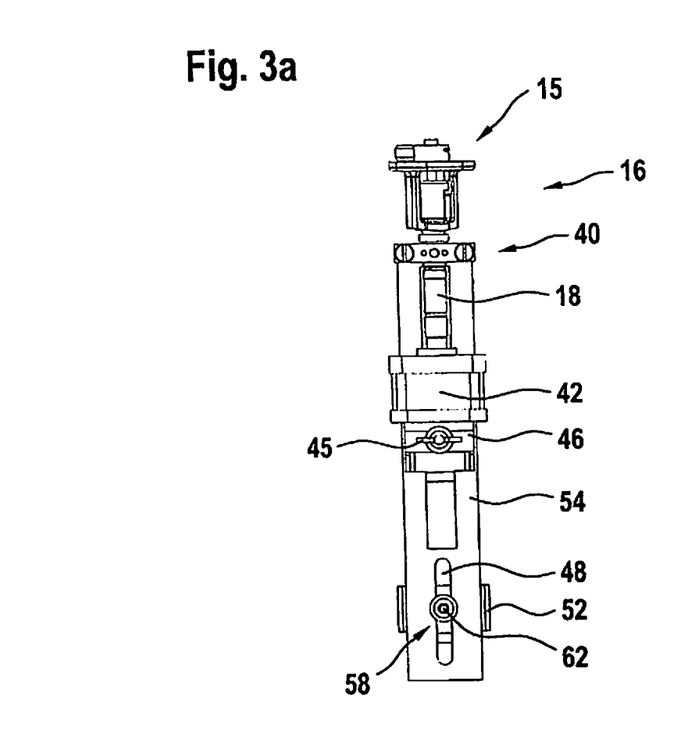
FIGS. 3a through 3c show different views of an injector holding device, as may be used in an exemplary embodiment of the present invention, including an injector clamped in it.
Figure 3B:
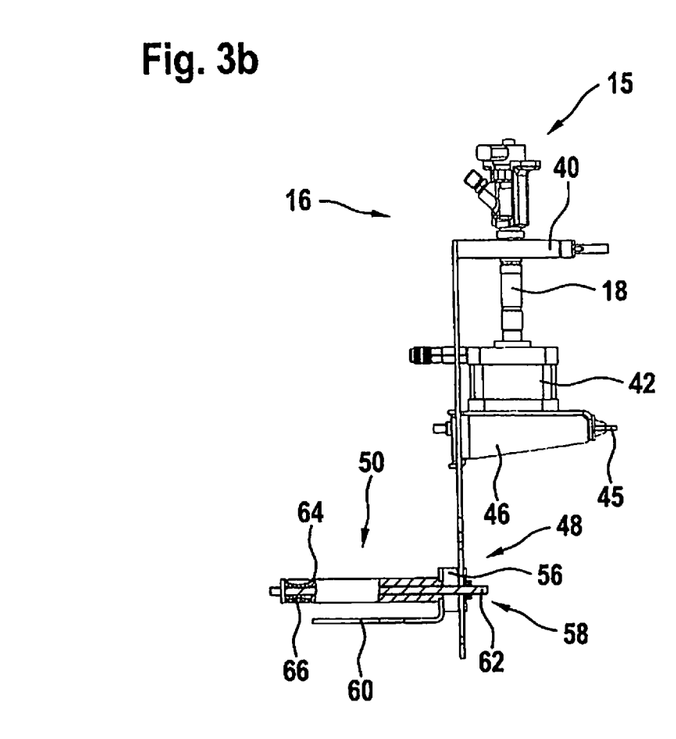
Figure 3C:
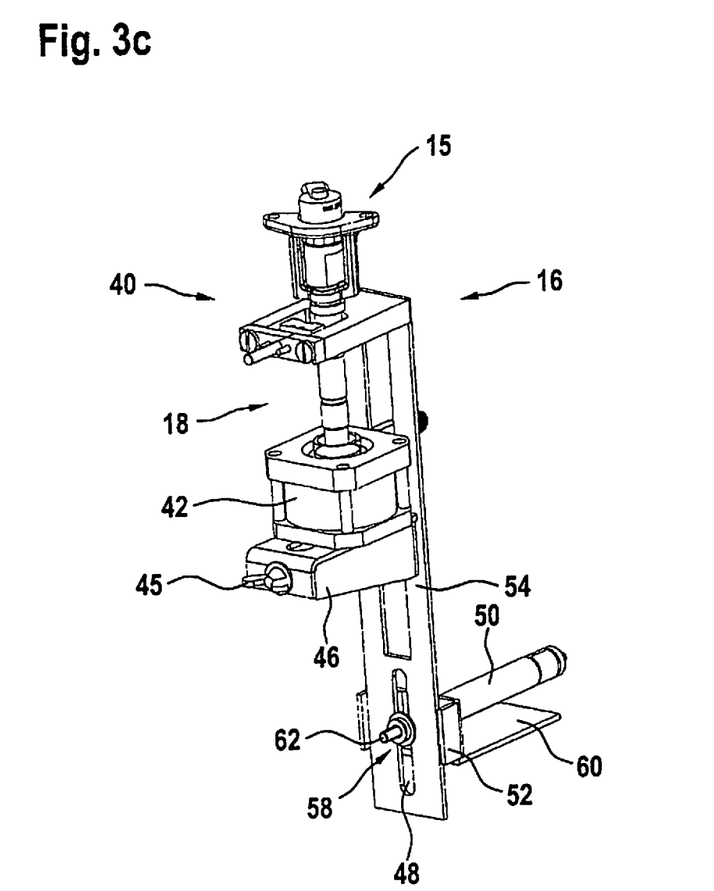

FIGS. 3a through 3c show different views of the injector holding device 16 having an injector 18 clamped in it.

Injector 18 is fixed in position in injector holding device 16 by a clamping device 40. Injection chamber 42 is positioned by moving an adjustable plate 46 over the nozzle of injector 18 (not visible in FIGS. 3a through 3c), and fixed in this position by tightening a clamping screw 45.

The high-pressure terminal of injector 18 is connected to rail 10 at connection piece 14, using a separable screw cap 15.

By pivoting the swiveling frame 22 about the horizontal axis, injector holding device 16 is suitably aligned with connection piece 14 in advance.

The height of injector 18 may be changed and adjusted as needed, using a slotted hole 48, which is formed in a support 54 of injector holding device 16. Lateral play in slotted hole 48 allows a lateral displacement.

By sliding a pin 50 in a tube 20 of support frame 4 (see FIG. 2a), injector holding device 16 may be moved back and forth.

The lateral inclination of injector holding device 16 may be adjusted, using the gap between a lateral guide 52 and support 54 of injector holding device 16.

The forward/backward inclination of injector 18 may be adjusted via rounded-off supports 56 and the inclination of compensating elements 58, e.g., a combination of a spherical disk and conical socket.

Injector holding device 16 is guided in tube 20 of support frame 3 via pin 50. A tongue 60 prevents rotation.

By rotating a spindle 62, whose handle is not shown in the figures, a cone 64 is pulled nearer in such a manner, that it expands a clamping ring 66. This deforms clamping ring 66 in tube 20 of support frame 3, and in this manner, allows the position of injector holding device 16 to be fixed without deformation.

Figure 4:
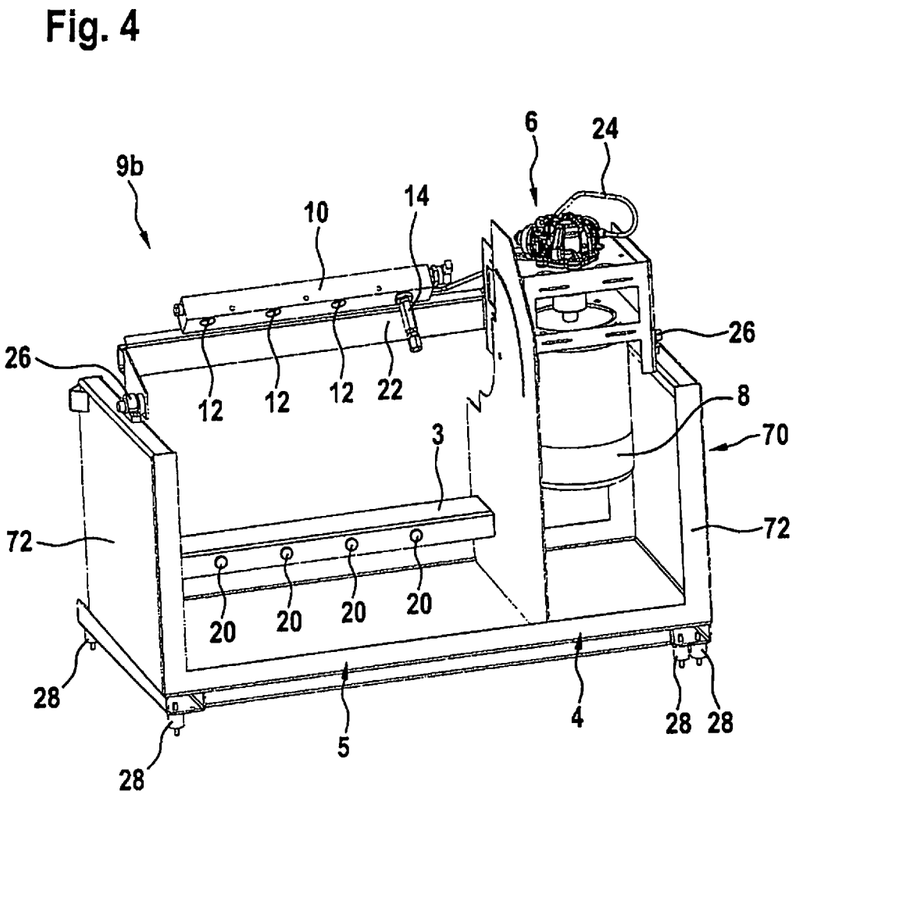
FIG. 4 shows a perspective front view of an assembly according to a further exemplary embodiment of the present invention.

FIG. 4 shows an alternative exemplary embodiment of an assembly 9b. In this exemplary embodiment, assembly 9b includes an oil trough 70 having raised side parts 72, which are configured to accommodate pillow block bearings 26 of swiveling frame 22. In the exemplary embodiment shown in FIG. 3, the complete oil trough 70 is supported elastically by pads 28.

Unlike in the exemplary embodiment shown in FIGS. 1, 2a and 2b, in this case, the axis of rotation of motor 8 is oriented not parallelly, but perpendicularly to the axis of rotation of swiveling frame 22. Thus, in this design, the orientation of the axis of rotation of motor 8 in space also changes in response to pivoting the swiveling frame 22.

In one further exemplary embodiment not shown in the figures, fluid pump 6 and motor 8 are attached to the non-pivoting, stationary region of device 2. In this case, as well, in order to be able to use rigid fluid lines 24 in place of flexible hoses for the fluid supply, a fluid adaptor 80 is positioned in the axis of rotation.

Figure 5A:
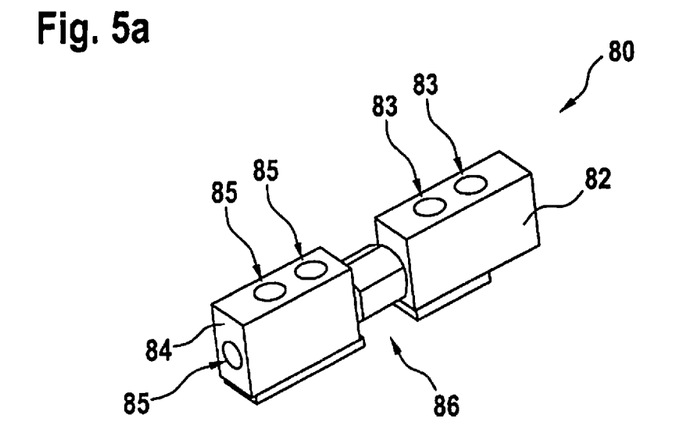
FIG. 5a shows a perspective view of an exemplary embodiment of a fluid adaptor.
Figure 5B:
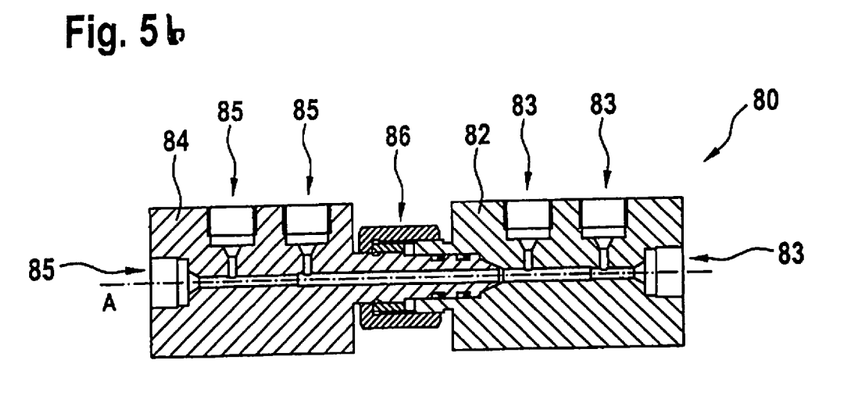
FIG. 5b shows a section of the exemplary fluid adaptor.

FIG. 5a shows a perspective view of an exemplary embodiment of such a fluid adaptor 80, and FIG. 5b shows a section of fluid adaptor 80.

Fluid adaptor 80 has an inlet-side element 82 and an outlet-side element 84, which is connected to inlet-side element 82 in such a manner, that it is rotatable about an axis A, with respect to inlet side element 82. Both inlet-side element 82 and outlet-side element 84 have at least one fluid connection 83, 85, respectively, which allows fluid lines 24 to connect to fluid adaptor 80 on both the inlet side and the outlet side. The connection 86 between inlet-side element 82 and outlet-side element 84 is also impervious at high fluid pressure.

Inlet-side element 82 of fluid adapter 80 is connected to the outlet of fluid pump 6. Outlet-side element 84 of fluid adapter 80 is connected to rail 10. Since outlet-side element 84 is rotatable with respect to inlet-side element 82, a rotatable fluid connection between fluid pump 6 and rail 10 may be implemented, even with rigid fluid lines 24 made of, e.g., steel.

What is claimed is:

1. An injector testing device, comprising:
   a fluid pump configured to convey a test oil;
   a motor connected mechanically to the fluid pump and configured to drive the fluid pump;
   at least one injector holding device configured to receive at least one injector to be tested; and
   a rail configured to receive the test oil conveyed by the fluid pump and to fluidly connect to at least one injector to be tested, wherein the rail is pivotable with respect to the at least one injector holding device,
   wherein the fluid pump and the motor are supported in such a manner that the fluid pump and the motor swivel in unison with the rail.

2. An injector testing device, comprising:
   a fluid pump configured to convey a test oil;
   a motor connected mechanically to the fluid pump and configured to drive the fluid pump;
   at least one injector holding device configured to receive at least one injector to be tested; and
   a rail configured to receive the test oil conveyed by the fluid pump and to fluidly connect to at least one injector to be tested, wherein the rail is pivotable with respect to the at least one injector holding device,
   wherein the fluid pump, the motor, and the rail are supported elastically in the injector testing device as a common assembly.

3. An injector testing device, comprising:
   a fluid pump configured to convey a test oil;
   a motor connected mechanically to the fluid pump and configured to drive the fluid pump;
   at least one injector holding device configured to receive at least one injector to be tested; and
   a rail configured to receive the test oil conveyed by the fluid pump and to fluidly connect to at least one injector to be tested, wherein the rail is pivotable with respect to the at least one injector holding device,
   wherein the motor and the fluid pump are supported elastically in the injector testing device by at least one pad.

4. An injector testing device, comprising:
   a fluid pump configured to convey a test oil;
   a motor connected mechanically to the fluid pump and configured to drive the fluid pump;
   at least one injector holding device configured to receive at least one injector to be tested; and
   a rail configured to receive the test oil conveyed by the fluid pump and to fluidly connect to at least one injector to be tested, wherein the rail is pivotable with respect to the at least one injector holding device,
   wherein the at least one injector holding device is displaceable in all three spatial directions.

5. An injector testing device, comprising:
   a fluid pump configured to convey a test oil;
   a motor connected mechanically to the fluid pump and configured to drive the fluid pump;
   at least one injector holding device configured to receive at least one injector to be tested; and
   a rail configured to receive the test oil conveyed by the fluid pump and to fluidly connect to at least one injector to be tested, wherein the rail is pivotable with respect to the at least one injector holding device,
   wherein the at least one injector holding device includes a spindle, a cone, and a clamping ring, which are formed in such a manner that the clamping ring is expandable by rotation of the spindle, in order to fix the injector holding device in position without deformation.

* * * * *